Sept. 15, 1925
A. T. LARSON
MANUFACTURE OF CATALYTIC MATERIALS
Filed April 25, 1923
1,554,008
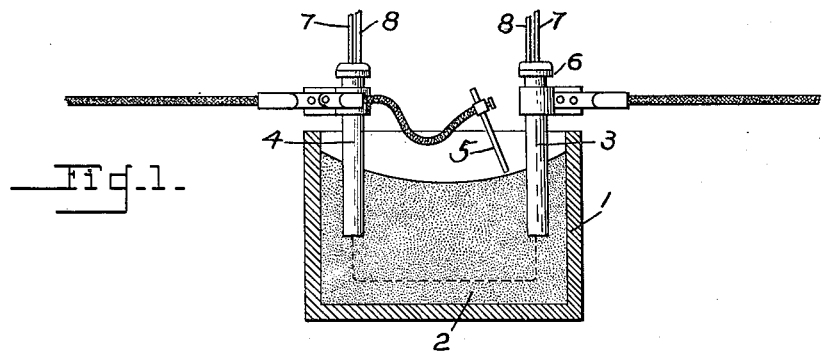
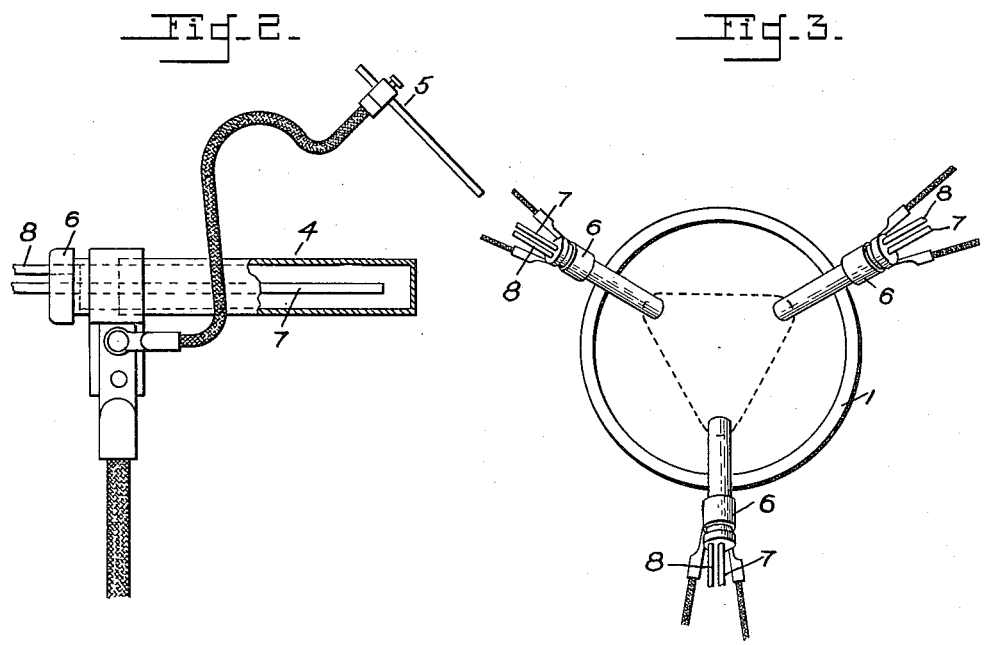
INVENTOR
*Alfred T. Larson*
BY
*W. N. Roach*
ATTORNEY Patented Sept. 15, 1925.

1,554,008

UNITED STATES PATENT OFFICE.

ALFRED T. LARSON, OF WASHINGTON, DISTRICT OF COLUMBIA, ASSIGNOR TO RICHARD C. TOLMAN, TRUSTEE.

MANUFACTURE OF CATALYTIC MATERIALS.

Application filed April 25, 1923. Serial No. 634,534.

*To all whom it may concern:*

Be it known that I, ALFRED T. LARSON, a citizen of the United States, and a resident of Washington, District of Columbia, have invented an Improvement in the Manufacture of Catalytic Materials, of which the following is a specification.

This invention relates to the manufacture of fused oxide catalysts and specifically to the manufacture of iron oxide catalysts which upon reduction may advantageously be employed in the direct synthesis of ammonia.

It is generally known that iron made by reducing iron oxide with hydrogen will catalyze the direct synthetic ammonia reaction. It is also known that the activity and the stability or longevity of such oxide catalyst can be greatly increased by a proper admixture of other oxides usually designated as promoters. For example, Bernthsen, (see communications to the 8th International Congress of Applied Chemistry, Volume 28, page 197) in discussing ammonia catalysts points out that "oxides, hydroxides, or salts of the alkalies, of the alkaline earths and the earth metals may promote or increase the activity of iron catalysts."

It is also known that the activity of the iron catalysts is very greatly decreased by the presence of certain impurities, frequently designated as catalyst poisons. Thus Bernthsen (loc. cit.) states that "iron containing 0.1% of sulphur is generally quite useless and even with 0.01% is of very little use." In order to obtain an active iron catalyst it is evident that there must be the closest control over its chemical composition.

Whenever fused oxides or their reduction products can be used as catalysts, they are to be preferred to any other form. Their activities are generally comparable with the materials prepared by other methods; oftentimes they are much more reactive, and they have the added advantage that they do not readily disintegrate or sinter when heated to the temperature at which the synthetic reaction usually takes place.

Close control of the chemical composition is not easily accomplished at the high temperature which is required to fuse iron oxide. The fusion could be carried out in a crucible if some suitable refractory material were known which did not attack or combine with the molten oxide; or, if slightly attacked did not seriously interfere with the activity of the catalyst. However at this high temperature the iron oxide either dissolves, or reacts readily with, nearly all substances. Refractory oxides and compounds such as alumina, magnesia, zircon, spinel and sillimanite have been investigated as crucible materials but contamination of the melt always occurs. Ferrotungsten, pure tungsten and carborundum have also been tried but with no more success. The oxide can be fused in a platinum crucible and although a little platinum is taken up by the oxide this does not effect its activity but the use of platinum in large scale preparation of catalysts is quite impracticable.

I have discovered a process for fusing iron oxide by means of which the chemical nature of the catalyst can be carefully controlled. With this process catalyst poisons can be excluded while the addition of catalyst promoters to the molten iron oxide is easily accomplished. I avoid the necessity of employing a crucible by fusing the catalyst material in a bed of the same composition. Since the bed never becomes hot enough to react with its support or container, there is no contamination of the bed and consequently no contamination of the molten material.

There are a number of ways in which an oxide can be fused and at the same time be surrounded by a protecting bed of the same composition. Thus I have directed an oxy-hydrogen flame into the mass and obtained a fusion thereby. I have also melted the catalyst material in an electric arc. A much more satisfactory process, however, consists in fusing the material between water cooled iron electrodes. Many oxides are conductors of electricity, especially when heated. Therefore, if electrodes are dipped into a bed of iron oxide and a heavy current of electricity passed the oxide between the electrodes fuses while the cooler portions of the bed serve as a receptacle for the melt thereby effectively preventing contamination of the molten oxide. Herein lies the essential features of my invention, namely, the fusing of a metallic oxide or mixtures of oxides while employing a bed of the same oxide or mixtures of oxides for the fused mass.

In the accompanying drawings I have shown, by way of illustration, an electric furnace equipped for carrying out my process, in which drawings:

Fig. 1 is a sectional view of an electric furnace;

Fig. 2 is a view in elevation, partly in section, of an electrode; and

Fig. 3 is a plan view of a furnace equipped for use with a three phase current.

Referring to the drawings by numerals of reference:

I may provide a metallic box 1 in which the metallic oxide 2, a portion of which is to be fused and into which the water cooled iron electrodes 3 and 4 are dipped is placed. The electrode 4 preferably has detachably secured thereto a starting electrode 5.

The electrodes, as seen most clearly in Fig. 2, may consist of an iron cylinder closed by a plug 6 through which passes the inlet water pipe 7 and the outlet pipe 8.

In making a batch of fused iron oxide the following procedure is described by way of illustration without any intention of limiting myself thereto.

Iron oxide from which catalytic material is to be manufactured is placed in the furnace 1. The water cooled electrodes are pushed into the batch and held in place by suitable clamps (not shown). Before starting the fusion the oxide material is hollowed out from the center and heaped around the edges of such hollow as shown most clearly in Fig. 1 so that when the material is melted it will remain in the center. Water is then started running through the electrodes and the electrical power is switched on. Since the electrical conductivity of the iron oxide increases rapidly as its temperature is raised, a comparatively low voltage (say 60 to 110 volts) may be employed if a bridge of molten material is formed between the electrodes. For example this bridge of molten material may be made by means of an oxy-hydrogen flame, but I find this can be most easily accomplished by using a starting electrode 5 (Fig. 2). This electrode is placed so near the opposite main electrode that the current which is flowing starts to melt the charge. The starting electrode is then gradually drawn toward the main electrode to which it is attached keeping it always in contact with the melting charge. After a bridge of molten material has been formed between the main electrodes, the starting electrode is unclamped and removed and used on another phase of the circuit if there be more than one.

Arcs which melt the starting electrode must be avoided since this molten material from the electrode might contaminate the batch. All phases are kept on the starting voltage until the ammeter indicates equal current in all phases. The connections are then changed to get lower voltage and the temperature of the batch subsequently controlled by varying the voltage. The batch is then stoked with a heavy iron bar so that the material on top will fall into the melt and be incorporated in it, otherwise it will sinter into a shell several inches above the melt. After two or three stokings, the top material is in the melt and a crust forms over the material after stoking is stopped. This crust which is about three-quarters of an inch thick is broken and incorporated with the melt several times. The power is then shut off and the electrodes removed. The melt is then allowed to cool in place or is rabbled into the batch depending on which method is better for the particular composition used. After cooling, the mass is weighed, crushed and sized, the fines from the sizing being saved for use in making another batch of the same composition.

In describing the nature of my invention I have referred specifically to the preparation of fused iron oxide. It is evident, however, that the method herein described for manufacturing a fused iron oxide catalyst may be employed in the reduction of other fused oxide catalysts, as for example, oxides of nickel or cobalt, or of mixtures of such oxides. It is also evident that suitable promoters may be added to fused oxides without departing from the scope of this invention. When this is desirable the promoter materials may be first mixed with the material in proper proportion by weight and then fused as described above or may be added after the oxide has been melted.

Although the fusion product of an oxide or mixture of oxides either with or without promoters may be employed directly as a catalyst in some reaction, as for example in the direct combination of sulphur dioxide and oxygen to form sulphur trioxide, or in the reaction between carbon monoxide and steam to form hydrogen, it is evident that when such materials are to be employed in certain other reactions, as for example, in the direct synthesis of ammonia, that the oxide must be reduced in hydrogen or by some other suitable means before it will accelerate reactions of this type. In designating the fusion product obtained from my process as a fused oxide catalyst I do not therefore limit myself to the use of the oxide as a catalyst but do include the reduction products of such oxides also.

I claim:

1. The process of making a fused oxide catalyst, embodying forming a bed of material from which the catalyst is to be made and applying heat to a portion of said bed to fuse said portion.

2. The process of making a catalytic material, embodying grading the material from which the catalytic material is to be made, forming a bed of the graded material and then fusing a portion of said bed.

3. The process of making an oxide catalyst, embodying forming a bed of material from which the catalyst is to be made, hollowing out said bed in the center, melting material in the hollow of said bed, stoking the crust formed into the molten material, allowing the molten material to cool and then crushing and sizing the cooled mass.

4. The process of making an oxide catalyst, embodying forming a bed of material from which the catalyst is to be made, melting material at the center of said bed, stoking the crust formed into the molten material, allowing the molten material to cool and then crushing and sizing the cooled mass.

5. The process of making an oxide catalyst, embodying forming a bed of the material from which the catalyst is to be made, melting a portion of the material in said bed, allowing the melted material to cool and then crushing and sizing the cooled mass.

6. The process of making an oxide catalyst, embodying forming a bed of the material from which the catalyst is to be made, hollowing out said bed in the center, melting the material in the hollow of said bed, allowing the molten material to cool and then crushing and sizing the cooled material.

7. The process of making a fused oxide catalyst, embodying forming a bed of the material from which the catalyst is to be made, inserting electrodes in the bed spaced apart a sufficient distance to allow current to flow, allowing current to flow until the oxide between the electrodes begins to melt, gradually drawing the electrodes apart until the desired distance is established, then continuing the flow of current until the mass between the electrodes is molten, and then cooling the melt.

8. The process for making fused oxide catalyst which consists in fusing the material from which the catalyst is to be made by means of an electric current flowing between electrodes embedded in the material, while employing material of the same composition as a bed for the fused mass.

9. The process for making fused oxide catalyst which consists in inserting electrodes into the material from which the catalyst is to be made, allowing current to flow until the material between the electrodes is molten, while employing material of the same composition as a bed for the fused mass, then allowing the mass to cool.

10. The process for making fused oxide catalyst which consists in inserting cooled electrodes into the material from which the catalyst is to be made, allowing current to flow until the material between the cooled electrodes is molten, while employing material of the same composition as a bed for the fused mass, then allowing the mass to cool.

11. The process for making fused oxide catalyst which consists in inserting cooled electrodes into the material from which the catalyst is to be made, applying an electric current to the electrodes, heating the surface of that portion of the catalyst material which lies between the cooled electrodes until current begins to flow, allowing current to flow until the mass between the electrodes is molten, while employing material of the same composition as a bed for the fused mass, and then allowing the mass to cool.

12. The process for making fused oxide catalyst which consists in inserting cooled electrodes into the material from which the catalyst is to be made, applying an electric current to the electrodes, heating the surface of that portion of the catalyst material which lies between the cooled electrodes by drawing an auxiliary electrode attached to one of the main electrodes, placed in close proximity to one of the cooled electrodes, toward the cooled electrode to which it is attached, allowing current to flow until the mass between the cooled electrodes is molten, while employing material of the same composition as a bed for the fused mass, and then allowing the mass to cool.

13. The process for making fused oxide catalyst containing a promoter, which consists in inserting cooled electrodes into a mixture of pure iron oxide and the promoter, applying an electric current to the electrodes, heating the surface of that portion of the catalyst material which lies between the cooled electrodes until current begins to flow, allowing current to flow until the mass between the electrodes is molten, while employing material of the same composition as a bed for the fused mass, and then allowing the mass to cool.

14. The process of making a fused iron oxide catalyst containing a promoter which consists of forming a bed comprising pure iron oxide and a suitable promoter, melting a portion of said oxide bed, allowing the melted material to cool, and then crushing and sizing the cooled mass.

15. The process of making a fused catalyst, embodying fusing the material from which the catalyst is to be formed in a bed of the same material.

ALFRED T. LARSON.